(12) United States Patent
Roh et al.

(10) Patent No.: US 8,238,959 B2
(45) Date of Patent: Aug. 7, 2012

(54) METHOD AND APPARATUS FOR CONTROLLING TRANSMISSION POWER IN MOBILE COMMUNICATION SYSTEM BASED ON FRACTIONAL FREQUENCY REUSE

(75) Inventors: Kwan-Hee Roh, Hwaseong-si (KR); Jae-Hee Cho, Seoul (KR); Yong-Seok Kim, Hwaseong-si (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 12/283,238

(22) Filed: Sep. 10, 2008

(65) Prior Publication Data
US 2009/0069043 A1 Mar. 12, 2009

(30) Foreign Application Priority Data
Sep. 11, 2007 (KR) .......................... 10-2007-0091963

(51) Int. Cl.
*H04B 7/00* (2006.01)

(52) U.S. Cl. ........................... 455/522; 455/69; 370/318
(58) Field of Classification Search .................. 455/69, 455/522; 370/318
See application file for complete search history.

(56) References Cited

U.S. PATENT DOCUMENTS

| 7,890,130 B2 * | 2/2011 | Sung et al. ..................... 455/522 |
| 2004/0180682 A1 * | 9/2004 | Kim ............................... 455/518 |
| 2005/0201295 A1 * | 9/2005 | Kim et al. ..................... 370/241 |
| 2007/0155387 A1 * | 7/2007 | Li et al. ......................... 455/441 |

* cited by examiner

*Primary Examiner* — Raymond Dean

(57) ABSTRACT

A method and apparatus for controlling a transmission (Tx) power in a mobile communication system based on fractional frequency reuse are provided. In a method of operating a base station (BS) for controlling the Tx power in the mobile communication system, the method includes receiving from neighboring BSs received signal strength indication (RSSI) information for one or more restricted band allocated, calculating backoff values of the Tx power for the restricted bands by using the RSSI information, and determining the Tx power for each restricted band by using a difference between the backoff value of the Tx power for the restricted band and a maximum Tx power. Accordingly, resources can be further effectively used.

20 Claims, 10 Drawing Sheets

METHOD AND APPARATUS FOR CONTROLLING TRANSMISSION POWER IN MOBILE COMMUNICATION SYSTEM BASED ON FRACTIONAL FREQUENCY REUSE

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Sep. 11, 2007 and assigned Serial No. 2007-91963, the entire disclosure of which is hereby incorporated by reference.

TECHNICAL FIELD OF THE INVENTION

The present invention relates to a method and apparatus for controlling a transmission power in a mobile communication system and, in particular, to a method and apparatus for controlling a transmission power for a restricted band in a mobile communication system based on fractional frequency reuse.

BACKGROUND OF THE INVENTION

In Orthogonal Frequency Division Multiple Access (OFDMA) systems based on a multi-carrier scheme, resources are allocated in a unit of subchannels consisting of subcarriers. That is, a whole subcarrier is divided to be shared by a plurality of users, and thus a multi-user diversity gain can be ensured in a frequency domain. In a broadband wireless communication system, the same frequency is reused by cells. According to a received signal strength indication (RSSI) and interference between neighboring cells in case of reusing the same frequency, an adaptive modulation and coding (AMC) scheme is applied to maximize a throughput.

Figure 1A:
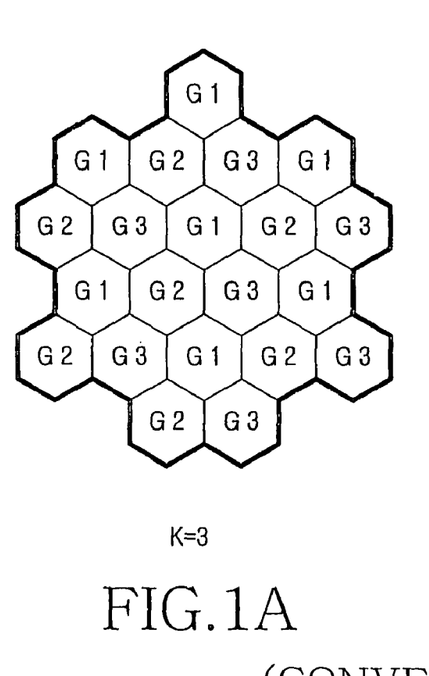
FIGS. 1A and 1B illustrate an example of cell frequency arrangement and frequency reuse.
Figure 1B:
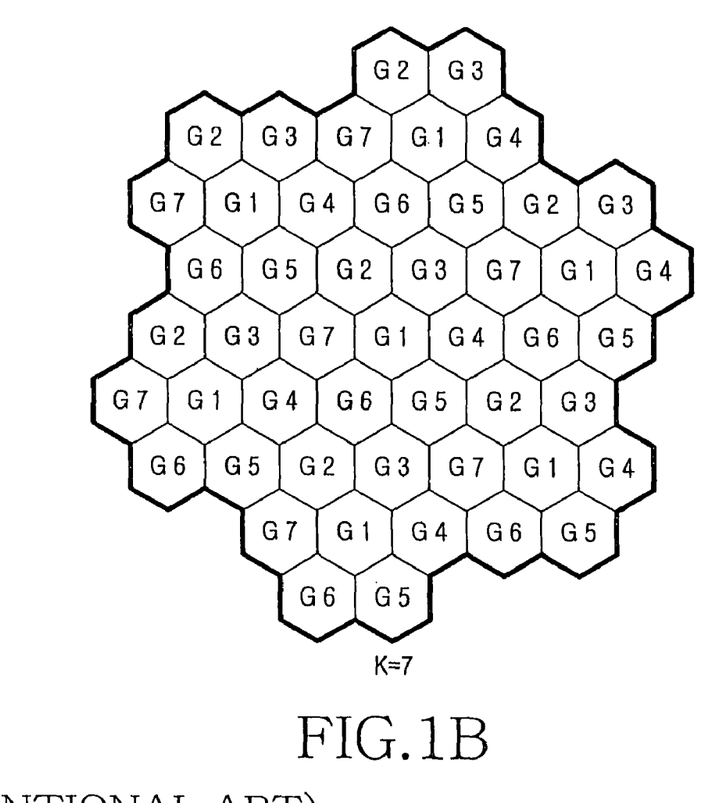

FIGS. 1A and 1B illustrate an example of cell frequency arrangement and frequency reuse. The same frequency is repeated and reused with a specific distance, and this is called "frequency reuse". A frequency reuse rate K is defined as a value indicating the number of cells using the same frequency, and is an important concept in a mobile communication system. The greater the frequency reuse rate, the farther the distance between cells using the same frequency, and thus the less the interference caused by the use of the same frequency.

FIG. 1A illustrates a case where the frequency reuse rate is three (3), wherein three frequencies are reused with a specific distance. FIG. 1B illustrates a case where the frequency reuse rate is seven (7), wherein seven frequencies are reused with a specific distance.

If the frequency reuse rate is one (1) in a system, interference between neighboring cells is significant in a boundary of a cell (or a sector). Thus, throughput deterioration is inevitable. As a method for improving performance in the cell boundary when using the frequency reuse rate of '1', a fractional frequency reuse (FFR) scheme can be considered in which a whole subcarrier is orthogonally divided into a plurality of subbands, and these subbands are properly arranged so that some of the subbands are unused by each cell, thereby reducing the same channel interference between the neighboring cells.

Mobile stations (MSs) are generally located in a center area and a boundary area of a cell, and are differently affected by interference caused by neighboring cells. This feature is used in the FFR scheme. That is, an MS located in the center area of the cell is close in distance to a base station (BS), and thus a path loss does not have a great effect on decrease in an RSSI of a signal component. However, since the MS is relatively far from a neighboring interfering BS, the MS is highly affected by the path loss and thus influence of a co-channel interference (CCI) is eventually decreased. On the other hand, an MS located in the boundary area of the cell is separated by a similar distance from both a serving BS and the interfering BS, and thus a signal component and an interference component are received in the same RSSI. Therefore, influence of the CCI is increased. Accordingly, in the FFR scheme, the MS located in the center area of the cell uses a resource having a frequency reuse rate of '1', and the MS located in the boundary area of the cell uses a resource having a frequency reuse rate greater than one (1). As a result, reception throughput of the MS located in the boundary area is ensured to some extent.

As described above, in the FFR scheme, in order to ensure reception performance in the boundary area of the cell, a resource having an increased frequency reuse distance is allocated. However, the increase in the frequency reuse distance results in decrease in an amount of radio resources available in each cell. As a result, capacity is reduced in comparison with a system having a frequency reuse rate of '1'. For example, if a resource having a frequency reuse rate of '1' and a resource having a frequency reuse rate of '3' are equally divided in 1:1, and in this state, if a resource having a frequency reuse rate of '3' is equally divided into three (3) parts, then an amount of frequency resources available in each cell is reduced to two thirds (⅔) of the case of using a frequency reuse rate of '1'. As such, the use of FFR scheme ensures a throughput of the MS located in the boundary area of the cell but disadvantageously decreases an amount of frequency resources that can be used in a BS. Therefore, there is a problem in that an overall cell capacity is reduced.

In order to avoid the reduction of cell capacity, a frequency reuse distance needs to be ensured. For this, a restricted band which is unused in each cell can be assigned to the MS located in the center area of the cell with a low transmission (Tx) power. That is, when the Tx power of the restricted band is maintained to be sufficiently low, the Tx power can be allocated to an MS located close to a BS in a condition that a CCI is not significantly generated. Therefore, resources can be further effectively used. Accordingly, there is a need for an apparatus and method for maintaining a CCI to a specific level in a restricted band.

SUMMARY OF THE INVENTION

To address the above-discussed deficiencies of the prior art, it is a primary aspect of the present invention to provide a method and apparatus for controlling a transmission (Tx) power to maintain a co-channel interference (CCI) to a specific level in a restricted band in a mobile communication system based on fractional frequency reuse.

Another aspect of the present invention is to provide a method and apparatus for controlling a Tx power to avoid decrease in cell capacity in a mobile communication system based on fractional frequency reuse.

In accordance with an aspect of the present invention, a method of operating a base station (BS) for controlling a Tx power in a mobile communication system based on fractional frequency reuse is provided. The method includes receiving from neighboring BSs received signal strength indication (RSSI) information for one or more restricted band allocated, calculating backoff values of the Tx power for the restricted bands by using the RSSI information, and determining the Tx power for each restricted band by using a difference between the backoff value of the Tx power for the restricted band and a maximum Tx power.

In accordance with another aspect of the present invention, a BS apparatus for controlling a Tx power in a mobile communication system based on fractional frequency reuse is provided. The apparatus includes a second selector for receiving from neighboring BSs RSSI information for one or more restricted bands allocated, and a restricted-band power allocator for calculating backoff values of the Tx power for the restricted bands by using the RSSI information and for determining the Tx power for each restricted band by using a difference between the backoff value of the Tx power for the restricted band and a maximum Tx power.

In accordance with another aspect of the present invention, a method of controlling a Tx power in a mobile communication system based on fractional frequency reuse is provided. The method includes receiving a report on measured RSSI values of neighboring BSs from mobile stations (MSs) using a protected band, transmitting a greatest RSSI value among the reported RSSI values to the neighboring BSs together with a band index through a backbone network, and selecting a greatest RSSI value from the RSSI values delivered from the neighboring BSs for each band and determining the Tx power of the restricted band for each band.

In accordance with another aspect of the present invention, a method of controlling a Tx power of a neighboring BS in a mobile communication system based on fractional frequency reuse is provided. The method includes receiving a report on a carrier to interference-plus-noise ratio (CINR) value of a common band and a CINR value of a protected band from MSs, selecting an MS that reports a smallest CINR value of the protected band, calculating a difference value between the CINR value of the common band and the CINR value of the protected band, and regulating the Tx power of the neighboring BS according to the difference value.

In accordance with another aspect of the present invention, an apparatus for controlling a Tx power of a neighboring BS in a mobile communication system based on fractional frequency reuse is provided. The apparatus includes a feedback unit for receiving a report on a CINR value of a common band and a CINR value of a protected band from MSs, a selector for selecting an MS that reports a smallest CINR value of the protected band, a calculator for calculating a difference value between the CINR value of the common band and the CINR value of the protected band, and a power controller for regulating the Tx power of the neighboring BS according to the difference value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention to be described hereinafter is related to a method and apparatus for controlling a transmission (Tx) power to utilize a restricted band unused in each cell in a mobile communication system based on fractional frequency reuse.

Figure 2:
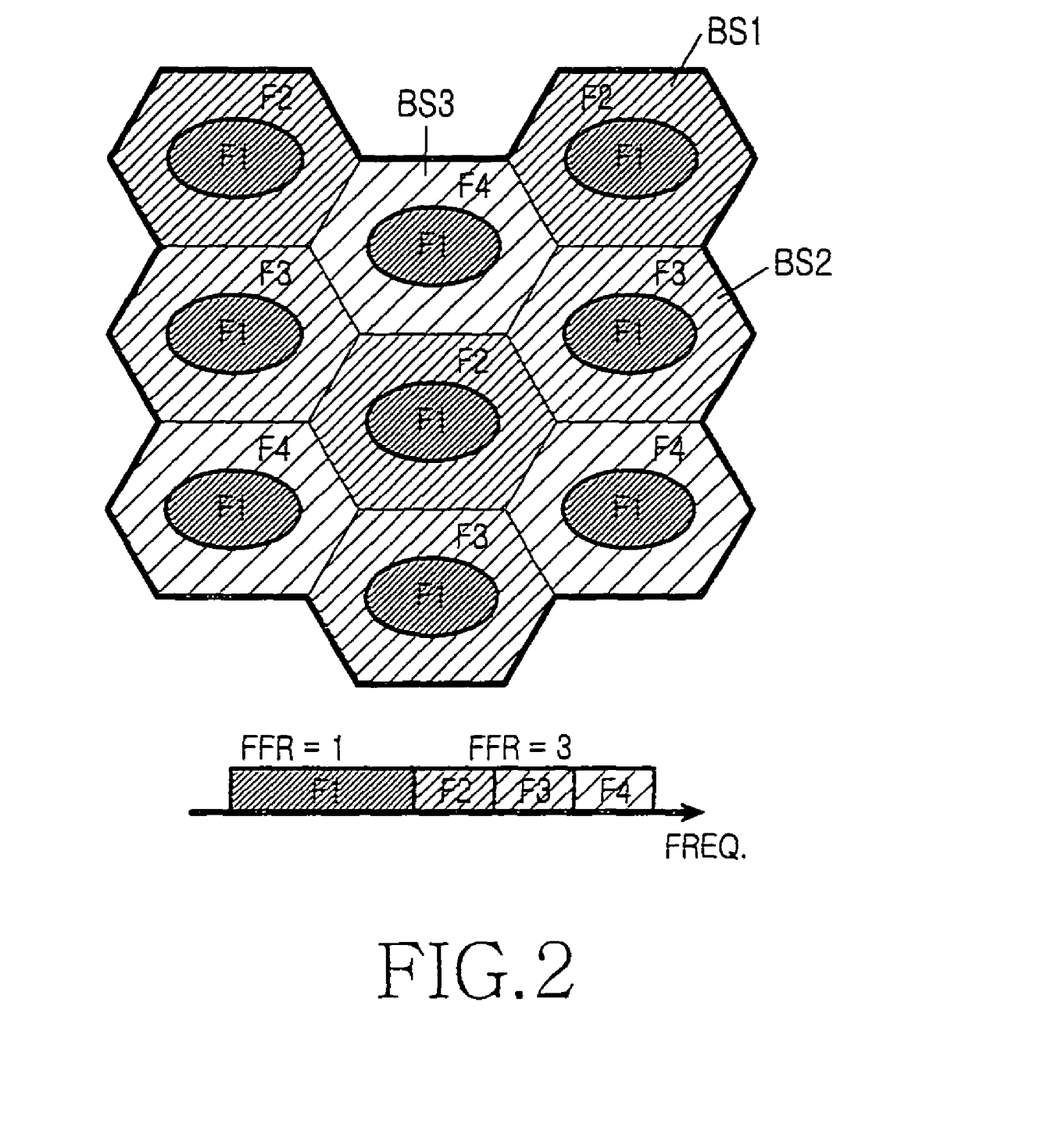
FIG. 2 illustrates an example of fractional frequency reuse according to an exemplary embodiment of the present invention.

FIG. 2 illustrates an example of fractional frequency reuse according to an exemplary embodiment of the present invention.

Referring to FIG. 2, a whole frequency resource is divided into a band F1 having a frequency reuse rate of '1' and bands F2, F3, and F4 having a frequency reuse rate of '3'. The band F1 is commonly used in a center area of each cell. One of the bands F2, F3, and F4 is used by one of three neighboring base stations (BSs), i.e., a BS1, a BS2, and a BS3. A restricted band denotes a resource unused by the BSs among the resources having a frequency reuse rate of '3'. The bands F3 and F4 are restricted bands for the BS1. The bands F2 and F4 are restricted bands for the BS2. The bands F2 and F3 are restricted bands for the BS3.

As such, according to the frequency reuse rate, the whole frequency band is divided into a common band (i.e., a band having a frequency reuse rate of '1'), a protected band (i.e., a band having a frequency reuse rate of '3'), and a restricted band (i.e., a band currently unused by the BSs among the bands having a frequency reuse rate of '3'). The common band, the restricted band, and the protected band are spatially divided in FIG. 2. However, the common band, the restricted band, and the protected band may be used in one cell area irrespective of a spatial division. The spatial division of the common band, the restricted band, and the protected band is to explain a general case of allocation in which the common band is allocated around a cell center and the protected band is allocated around the cell boundary.

Figure 3:
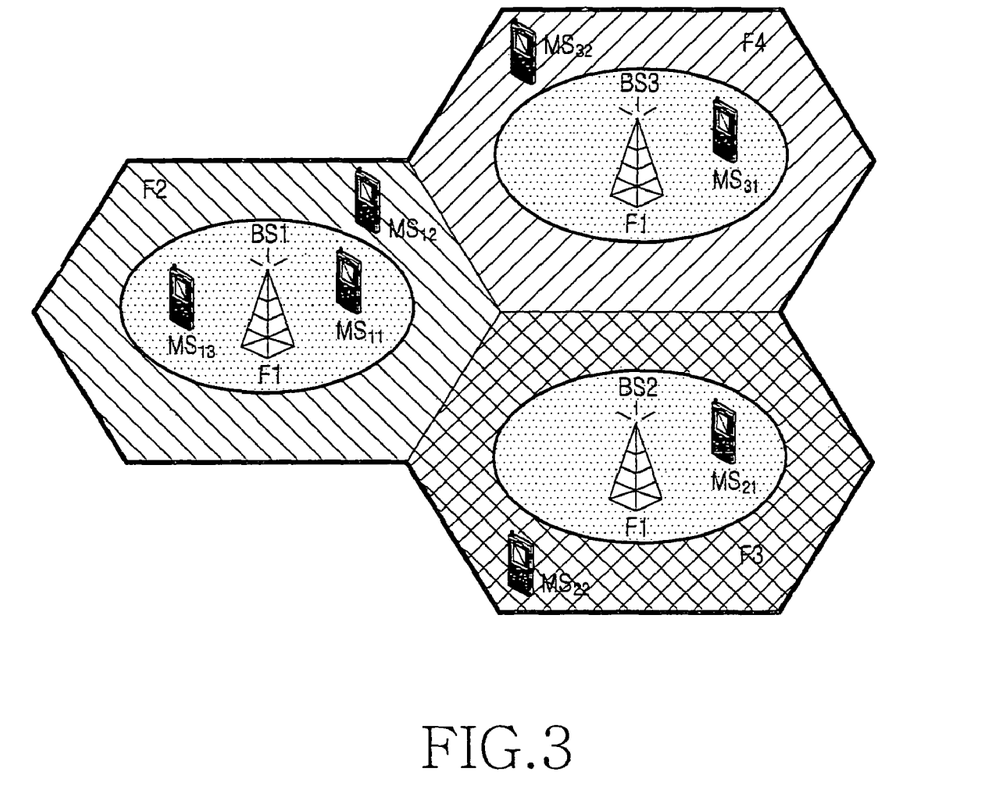
FIG. 3 illustrates an example of a mobile communication system based on fractional frequency reuse according to an exemplary embodiment of the present invention.

FIG. 3 illustrates an example of a mobile communication system based on fractional frequency reuse according to an exemplary embodiment of the present invention. Herein, each BS uses a frequency reuse rate of '1' in a cell center and uses a frequency reuse rate of '3' in a cell boundary. Band division depending on the frequency reuse rate of each BS is shown in Table 1 below.

TABLE 1

|  | Common band | Protected band | Restricted band |
| --- | --- | --- | --- |
| BS1 | F1 | F2 | F3, F4 |
| BS2 | F1 | F3 | F2, F4 |
| BS3 | F1 | F4 | F2, F3 |

The BS1 uses a common band F1, and also uses a protected band F2 in a cell boundary area. In the BS1, protected bands F3 and F4 of neighboring BSs (i.e., BS2 and BS3) are used as restricted bands. The BS2 uses a common band F1, a protected band F3, and restricted bands F2 and F4. The BS3 uses a common band F1, a protected band F4, and restricted bands F2 and F3.

Referring to FIG. 3, the restricted band is basically reserved in each BS in order to suppress interference between the same channels. However, each BS uses a minimum Tx power so that interference to its neighboring BS is generated only up to an allowable level. Therefore, each BS can use the restricted band by allocating it to a mobile station (MS) located near the BS. That is, a restricted band of each BS is used as a protected band of its neighboring BS, and thus, in order to use the restricted band, there is a need for properly regulating the Tx power for the restricted band so as to minimize interference of the same channel of the MS which uses the protected band of the neighboring BS.

For example, an $MS_{22}$ uses the protected band F3 of the BS2, and an $MS_{32}$ uses the protected band F4 of the BS3. It is assumed herein that the $MS_{13}$ of the BS1 is located sufficiently close in distance to its serving BS (i.e., BS1) and thus resources can be allocated to the $MS_{13}$ by using the restricted bands F3 and F4. In order for the BS1 to allocate resources to the $MS_{13}$ in the restricted band, a corresponding band (i.e., the protected band of its neighboring BS) is used. Thus, interference of downlink (DL) interference signals with respect to the $MS_{22}$ and the $MS_{32}$ belonging to the coverage of the neighboring BS of the $MS_{11}$ may remain below an appropriate level. For this, there is a need for controlling a Tx power for the restricted band. According to a method of regulating a Tx power according to the present invention, a received signal strength indication (RSSI) is measured and reported by an MS which is currently using a protected band of its neighboring BS, and the RSSI is delivered through a backbone network. Accordingly, the Tx power is regulated in the restricted band so that influence of an interference signal received by the MS is maintained to an appropriate level. Details of the method will be described below with reference to FIG. 4.

According to another method of regulating a Tx power, MSs which are currently using protected bands of respective BSs report a carrier to interference-plus-noise ratio (CINR) of a common band and a CINR of protected band, and a difference value between the two CINRs is used. Unlike the common band, the protected band is less affected by interference from a neighboring BS. Thus, a CINR value of the protected band is always greater than that of the common band. For example, if I1, I2, and I3 denote interferences received from cells G1, G2, and G3, respectively, and if influence of the interferences I1, I2, and I3 is constant on average, the CINR value of the protected band is greater than that of the common band by about 5 dB. If an MS is located in a cell boundary area, the influence of the interferences I1, I2, and I3 may differ. Therefore, in comparison with the common band, a primary interference source can be removed in the protected band in which a frequency reuse distance is increased. Accordingly, a difference between the CINR value of the protected band and the CINR value of the common band can be above 5 dB.

If the MS is located in the cell boundary area, the interferences I1, I2, and I3 differ. The protected band, in which a frequency reuse distance is increased, can obtain a greater CINR value than the common band.

Meanwhile, when a BS uses the restricted band to compensate for decrease of spectral efficiency as a result of applying fractional frequency reuse (FFR), an MS which uses a protected band of a neighboring BS experiences decrease in a CINR by the same amount as increase of the resultant interference. Therefore, in order to recognize an interference level in the protected band of the BS, CINR values of the common band and the protected band are reported to the BS from an MS which is assigned with a corresponding band and which is currently using the assigned band, and thereafter, a difference between the two CINR values is used by the BS. That is, if the reported difference between two CINR values is great, it can be determined that interference influence in the protected band is not significant. Thus, the BS requests its neighboring BS to increase the Tx power. On the contrary, if the reported difference between the two CINR values is decreased to below a specific level, it can be determined that the interference influence is increased in the protected band. Thus, the BS can request its neighboring BS to decrease the Tx power.

Each of MSs currently using protected bands of respective BSs measures a DL CINR in a common band (i.e., a band having a frequency reuse rate of '1') and a protected band (i.e., a band having a frequency reuse rate of '3'), and thereafter reports the measurement result to its serving BS. The CINR value of the common band and the CINR value of the protected band reported by an MS to which resources are allocated in the protected band are used by the BS when it is determined whether influence of an interference signal is large or small in the protected band. Then the BS delivers the determination result to its neighboring BS through the backbone network, and thus requests regulation of the Tx power. In the determination on whether the interference influence is large or small in the protected band, a difference between the CINR value of the common band and the CINR value of the protected band for an MS having a minimum CINR is compared with a threshold. Details thereof will be described below with reference to FIG. 9.

Figure 4:
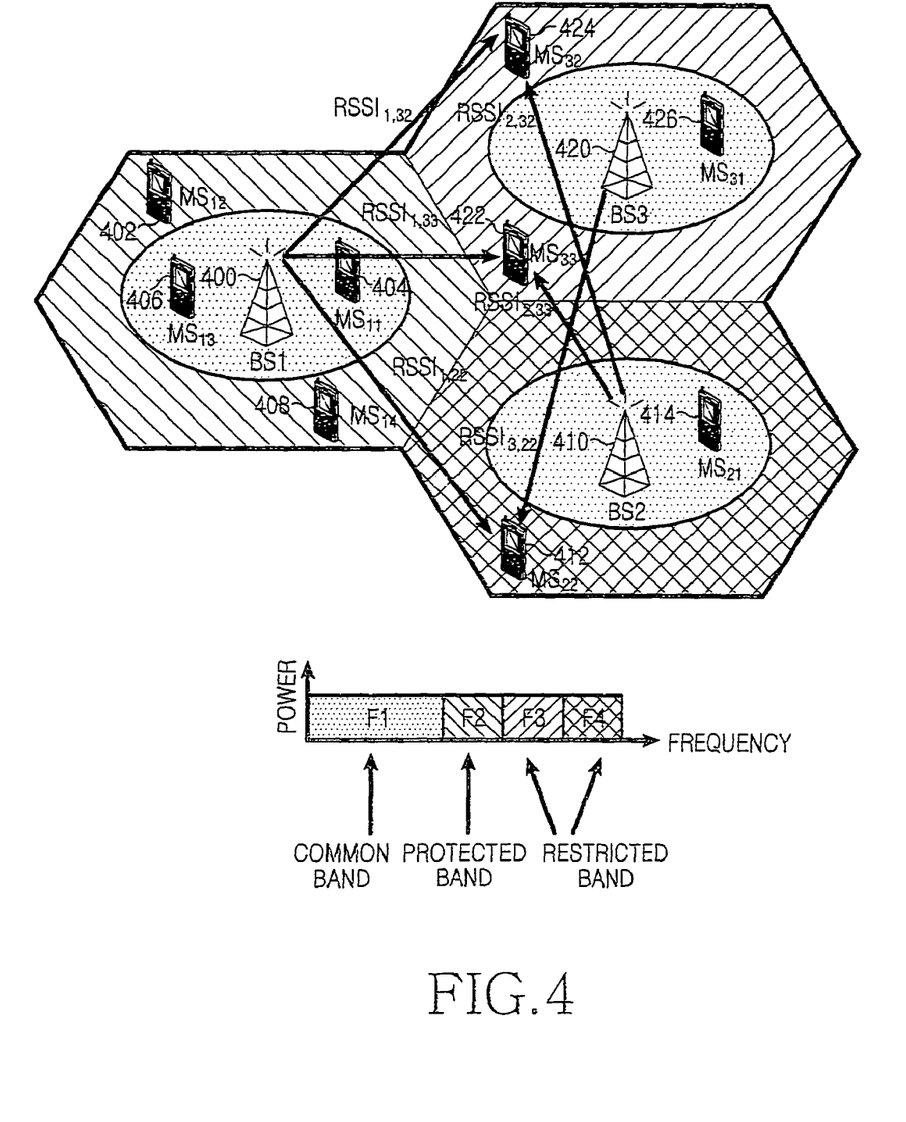
FIG. 4 illustrates an example of determining a transmission (Tx) power of a restricted band by using a received signal strength indication (RSSI) according to an exemplary embodiment of the present invention.

FIG. 4 illustrates an example of determining a Tx power of a restricted band by using an RSSI according to an exemplary embodiment of the present invention.

Referring to FIG. 4, a BS1, a BS2, and a BS3 report a neighbor list including their neighboring BSs through a DL control channel. Thereafter, the BSs (i.e., the BS1, the BS2, and the BS3) request MSs (i.e., an $MS_{13}$, an $MS_{14}$, an $MS_{22}$, and an $MS_{32}$) assigned with a protected band to measure and report RSSIs for the respective BSs belonging to the neighbor list. The MSs (i.e., the $MS_{13}$, the $MS_{14}$, the $MS_{22}$, and the $MS_{32}$) acquire DL synchronization with the respective BSs included in the neighbor list and thereafter measure the RSSIs by using preambles. After completing the measurement on the DL RSSIs for the respective BSs included in the neighbor list, the $MS_{12}$, the $MS_{22}$, and the $MS_{32}$ report the measured RSSI values together with indices of the respective BSs. The BSs (i.e., the BS1, the BS2, and the BS3) classify the RSSI values reported by the MSs (i.e., the $MS_{12}$, the $MS_{14}$, the $MS_{22}$, and the $MS_{32}$) according to the indices of the respective BSs and select greatest RSSI values. That is, an RSSI value to be used is measured by an MS having a greatest interference influence with respect to all BSs included in the neighbor list. The BSs (i.e., the BS1, the BS2, and the BS3) report the RSSI values together with an index of the protected band to the respective BSs included in the neighbor list through a backbone network. The BSs (i.e., the BS1, the BS2, and the BS3) classify the RSSI values delivered from their neighboring BSs for each restricted band, and select greatest RSSI values. A difference between the selected RSSI value and a noise floor level is used when a Tx power for each restricted band is determined. The Tx power is determined such that an influence of an interference signal is below a specific value Γ with respect to a noise floor.

For example, when the BS1 400 receives RSSI values from the BS2 410 and the BS3 420 and determines a Tx power for the restricted bands F3 and F4, it is assumed that $RSSI_{1,22}$=−100 dBm, $RSSI_{1,33}$=−95 dBm, $RSSI_{1,32}$=−110 dBm, $RSSI_{2,32}$=−100 dBm, $RSSI_{2,33}$=−95 dBm, $RSSI_{3,22}$=−125 dBm, N=−110 dBm, and Γ=−10 dB. Herein, $RSSI_{a,b}$ denotes an RSSI value between a $BS_a$ and a $MS_b$.

The BS2 410 delivers $RSSI_{1,22}$ (−100 dBm) together with an index of a band F3 to the BS1 400. Further, the BS2 410 delivers $RSSI_{3,22}$ (−125 dBm) together with the index of the band F3 to the BS3 420. The BS3 420 delivers a greater value (i.e., −95 dBm) between $RSSI_{1,32}$ and $RSSI_{1,33}$ together with an index of a band F4 to the BS1 400. Further, the BS3 420 delivers a greater value (i.e., −95 dBm) between $RSSI_{2,32}$ and $RSSI_{2,33}$ together with the index of the band F4 to the BS2 410. The BS1 400 determines an RSSI value (i.e., −100 dBm) in the band F3 from the BS2 410. Further, the BS1 400 receives an RSSI value (i.e., −95 dBm) in the band F4 from the BS3 420. Therefore, the BS1 400 determines a backoff value β of the Tx power for the restricted band according to Equation 1 below by using a Tx power for the band F3. In this case, the backoff value β is 20 dB. Likewise, the backoff value β in the band F4 is calculated to be 25 dB. If a maximum Tx power for the BSs is 43 dBm, the BS1 determines the Tx power for the band F3 to be 23 dBm, and also determines the Tx power for the band F4 to be 18 dB.

$$RSSI-N-\beta \leq \Gamma. \quad \text{[Eqn. 1]}$$

In Equation 1, RSSI denotes an RSSI value measured by a corresponding MS, N denotes a noise floor level, β denotes a backoff value of a Tx power, Γ denotes a threshold for maintaining an RSSI of a signal, which is transmitted in a restricted band of a neighboring BS, to be below a specific value with respect to thermal noise.

Figure 5:
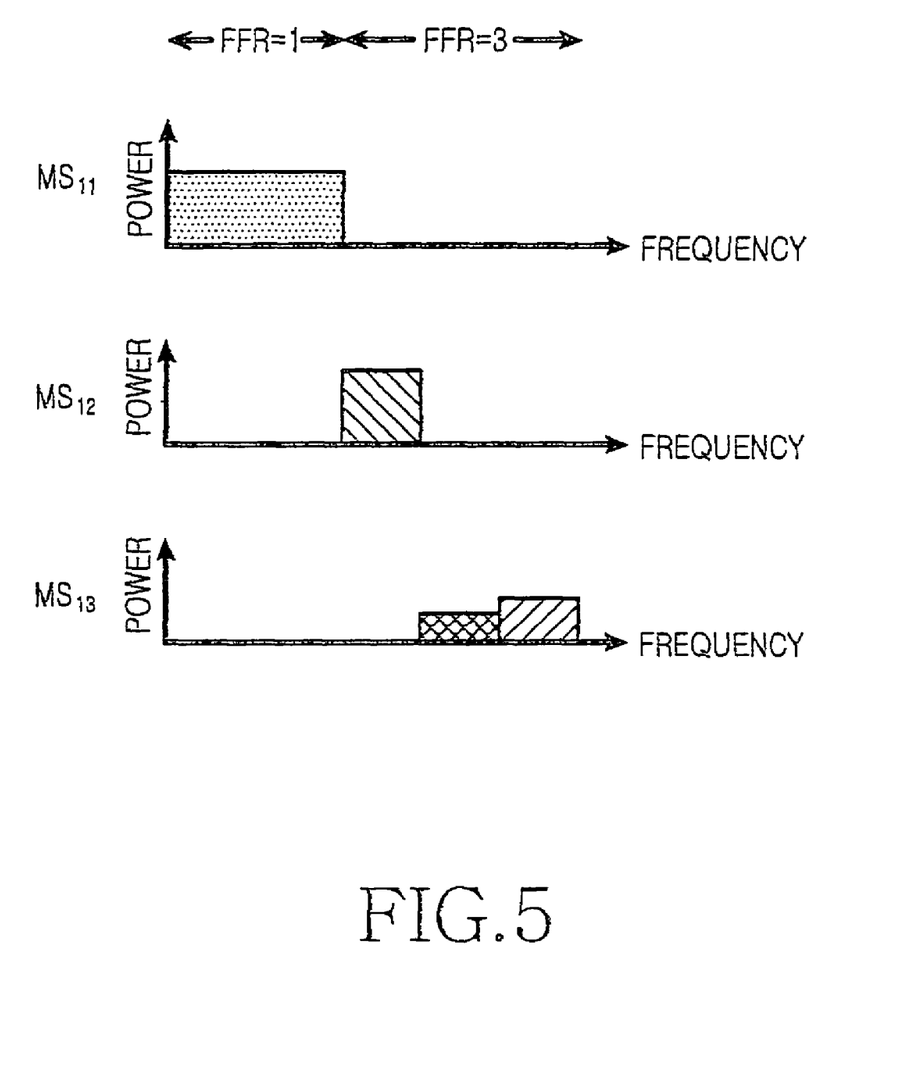
FIG. 5 illustrates an example of frequency allocation and Tx power allocation for each mobile station (MS) according to an exemplary embodiment of the present invention.

FIG. 5 illustrates an example of frequency allocation and Tx power allocation for each MS according to an exemplary embodiment of the present invention.

Referring to FIG. 5, resources are allocated to a plurality of MSs belonging to the coverage of the BS1 of FIG. 5. Resources are allocated to an $MS_{11}$ through a common band having a frequency reuse rate of '1'. Resources are allocated to an $MS_{12}$ through a protected band having a frequency reuse rate of '3'. Resources are allocated to an $MS_{13}$ through restricted bands F3 and F4. Since the bands F3 and F4 are protected bands of neighboring BSs, signals are transmitted with a relatively lower power level in these bands in comparison with other bands.

Figure 6:
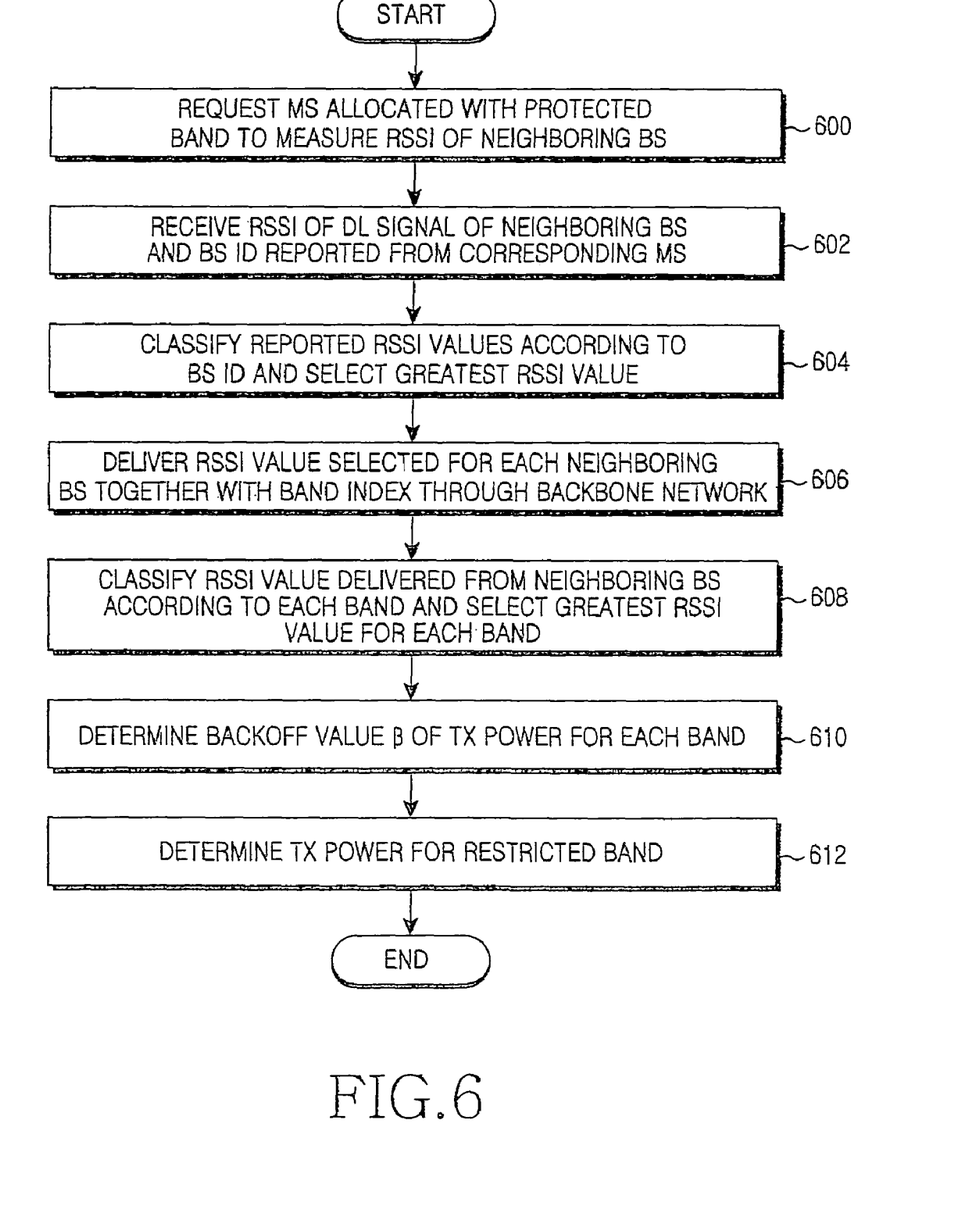
FIG. 6 is a flowchart illustrating an operation of a base station (BS) for controlling a Tx power for a restricted band in a mobile communication system based on fractional frequency reuse according to an exemplary embodiment of the present invention.

FIG. 6 is a flowchart illustrating an operation of a BS for controlling a Tx power for a restricted band in a mobile communication system based on fractional frequency reuse according to an exemplary embodiment of the present invention.

Referring to FIG. 6, the BS requests a plurality of MSs allocated with a protected band to measure RSSIs of neighboring BSs in step 600. For example, in FIG. 4, the BS1 400 requests the $MS_{12}$ and the $MS_{14}$ to measure RSSIs, and the BS2 410 requests the $MS_{22}$ to measure RSSIs, and the BS3 420 requests the $MS_{32}$ and the $MS_{33}$ to measure RSSIs.

Although it has been described that the RSSIs are measured at the request of the BS, according to embodiments, an MS may measure the RSSIs without the request of the BS and thereafter may report the measurement result to the BS by using an additional message (e.g., MOB_REP_RSP or MOB_MSHO_REQ). A process in which the MS measures and reports the RSSIs of the neighboring BSs is performed in a general handover procedure. Thus, without having to additionally perform such a process of the present invention, it is also possible to use a result obtained from the handover procedure.

In step 602, the BS receives RSSIs of DL signals of the neighboring BSs and BS IDs reported from corresponding MSs. For example, in FIG. 4, the $MS_{22}$ measures an $RSSI_{1,22}$ between the BS1 400 and the $MS_{22}$ and an $RSSI_{3,22}$ between the BS3 420 and the $MS_{22}$ and reports the measured RSSI values to the BS2 410. The $MS_{32}$ measures an $RSSI_{1,32}$ between the BS1 400 and the $MS_{32}$ and an $RSSI_{2,32}$ between the BS2 410 and the $MS_{32}$ and reports the measured RSSI values to the BS3 420. The $MS_{33}$ measures an $RSSI_{1,33}$ between the BS1 400 and the $MS_{33}$ and reports the measured RSSI values to the BS3 420.

In step 604, the BS classifies the reported RSSI values according to the BS IDs and selects a greater RSSI value. In step 606, the BS delivers the RSSI value selected for each of neighboring BSs together with a band index through a backbone network. For example, the BS2 410 delivers $RSSI_{1,22}$ (−100 dBm) together with an index of a band F3 to the BS1 400. Further, the BS2 410 delivers $RSSI_{3,22}$ (−125 dBm) together with the index of the band F3 to the BS3 420. The BS3 420 delivers a greater value (i.e., −95 dBm) between $RSSI_{1,32}$ and $RSSI_{1,33}$ together with an index of a band F4 to the BS1 400. Further, the BS3 420 delivers a greater value (i.e., −95 dBm) between $RSSI_{2,32}$ and $RSSI_{2,33}$ together with the index of the band F4 to the BS2 410.

It is described herein that an MS of a neighboring BS measures an RSSI value and the measured RSSI value is delivered through the backbone network. According to embodiments, however, among MSs belonging to a cell area of a BS, MSs located near a boundary area may request the measurement of the RSSI value. By using the reported value, it is also possible to determine a Tx power such that interference influence in a region outside the cell area is below a specific level.

In step 608, the BS classifies RSSI values delivered from neighboring BSs and selects a greatest RSSI value for each band. For example, the BS1 400 determines an RSSI value (i.e., −100 dBm) in the band F3 from the BS2 410. Further, the BS1 400 receives an RSSI value (i.e., −95 dBm) in the band F4 from the BS3 420.

In step 610, the BS determines a backoff value β of a Tx power for each band (see Equation 1 above). In step 612, the BS determines a Tx power for a restricted band.

The MS measures and reports the RSSI for each BS. However, when the MS knows a maximum Tx power of each BS, the MS may directly calculate and report a path loss value instead of the RSSI. In addition, the Γ value of Equation 1 above is used for maintaining an RSSI of a signal, which is transmitted in a restricted band of a neighboring BS, to be below a specific value with respect to thermal noise. The Γ value is a system operation parameter. The Γ value may be a default value used by all BSs or may be modified through an additional negotiation process between BSs. For example, if the Γ value is set to −10 dB, each BS determines a Tx power so that an RSSI of a specific signal is less than thermal noise by 10 dB, wherein the specific signal is transmitted to an MS having a greatest RSSI due to a smallest path loss among MSs currently using a protected band of each neighbor BS. Meanwhile, a Tx power level is determined when power control is performed in the restricted band. The determined Tx power level may be equal to or less than the maximum Tx power.

Thereafter, the procedure of FIG. 6 ends.

Figure 7:
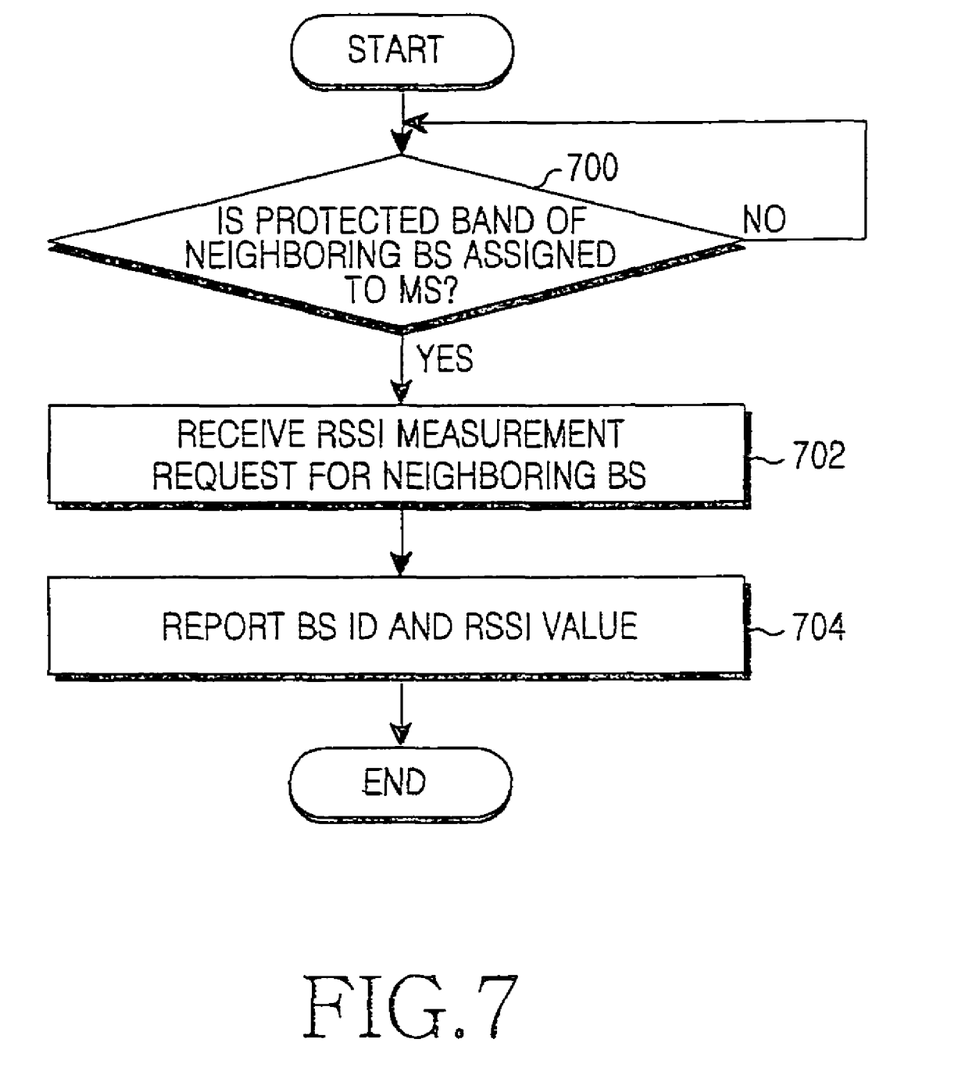
FIG. 7 is a flowchart illustrating an operation of an MS for controlling a Tx power for a restricted band in a mobile communication system based on fractional frequency reuse according to an exemplary embodiment of the present invention.

FIG. 7 is a flowchart illustrating an operation of an MS for controlling a Tx power for a restricted band in a mobile communication system based on fractional frequency reuse according to an exemplary embodiment of the present invention.

Referring to FIG. 7, when a protected band of a neighboring BS is assigned to the MS, the MS uses the protected band in step 700. Then, the MS receives an RSSI measurement request for the neighboring BS from a serving BS in step 702.

In step 704, the MS reports a neighboring BS ID and an RSSI measurement value to the serving BS.

Thereafter, the procedure of FIG. 7 ends.

Figure 8:
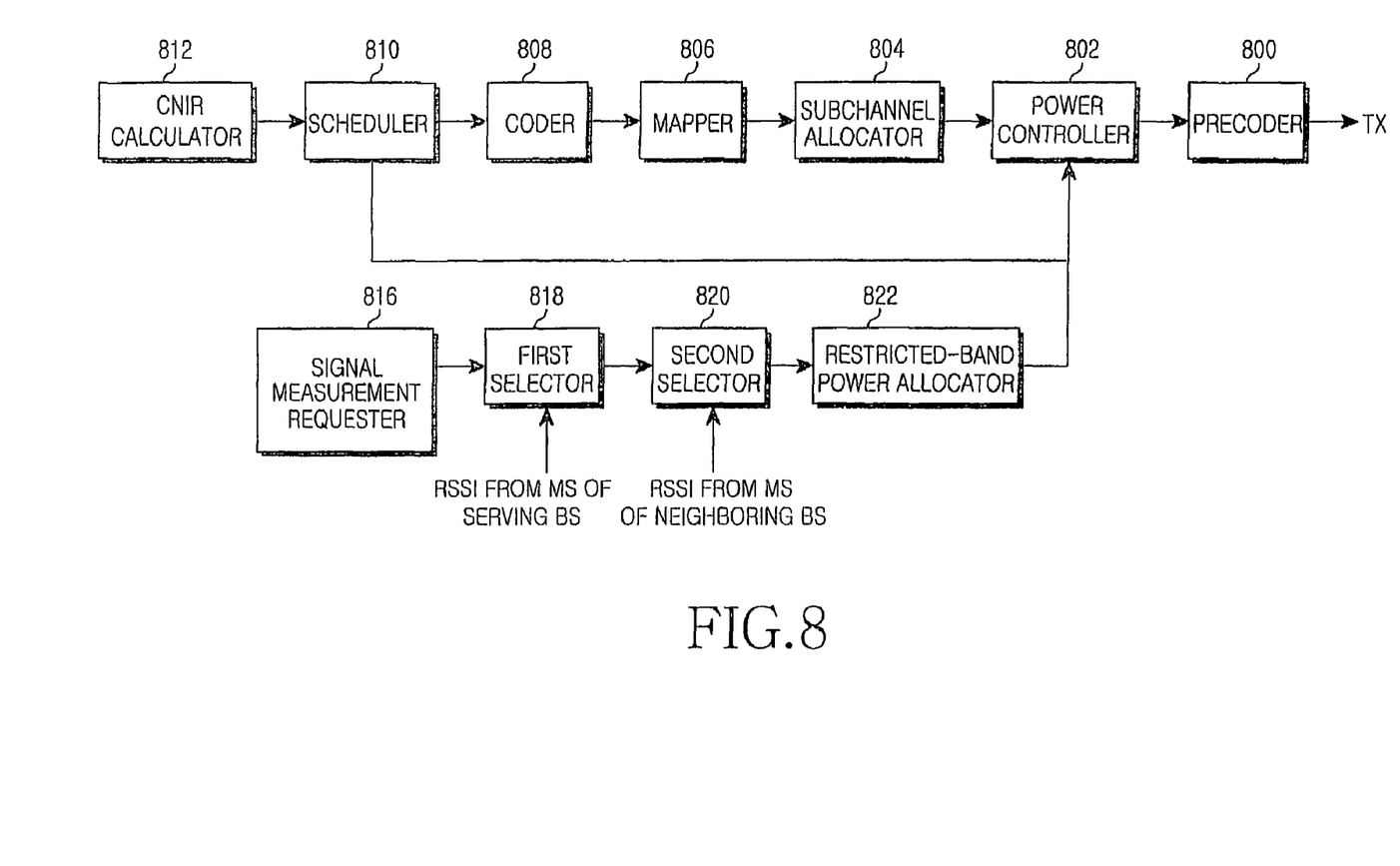
FIG. 8 is a block diagram of a BS for controlling a Tx power for a restricted band in a mobile communication system based on fractional frequency reuse according to an exemplary embodiment of the present invention.

FIG. 8 is a block diagram of a BS for controlling a Tx power for a restricted band in a mobile communication system based on fractional frequency reuse according to an exemplary embodiment of the present invention.

Referring to FIG. 8, the BS includes a precoder 800, a power controller 802, a subchannel allocator 804, a mapper 806, a coder 808, a scheduler 810, a CINR calculator 812, a signal measurement requester 816, a first selector 818, a second selector 820, and a restricted-band power allocator 822.

The signal measurement requester 816 requests MSs assigned with a protected band to measure RSSIs of neighboring BSs. The first selector 818 receives a report on DL RSSIs of the neighboring BSs and BS IDs from the MSs. The first selector 818 classifies the reported RSSI values according to the BS IDs, and selects a greatest RSSI value. The second selector 820 receives the selected RSSI value together with a band index through a backbone network, classifies the RSSI values received from the neighboring BSs according to each band, and selects a greatest RSSI value for each band.

The restricted-band power allocator 822 determines a backoff value β of a Tx power for each band and thus determines a Tx power for a restricted band (see Equation 1 above). The Γ value of Equation 1 above is used for maintaining an RSSI of a signal, which is transmitted in a restricted band of a neighboring BS, to be below a specific value with respect to thermal noise. For example, if the Γ value is set to −10 dB, each BS determines a Tx power so that an RSSI of a specific signal is less than thermal noise by 10 dB, wherein the specific signal is transmitted to an MS having a greatest RSSI due to a smallest path loss among MSs currently using a protected band of each neighbor BS.

The CINR calculator 812 measures a DL CINR for each MS by using DL channel information measured and reported by each MS and by using a Tx power determined by the BS for a corresponding band. The scheduler 810 determines a priority of each MS by using the estimated CINR value, and selects an MS to be assigned with a resource. Further, the scheduler 810 determines a position and amount of the resource to be assigned to the selected MS and also determines a modulation order and a coding rate. The coder 808 receives data from the scheduler 810 and codes the data by using a convolution code or a convolutional turbo code (CTC). The mapper 806 performs constellation mapping on a bit-stream received from the coder 808 and outputs the mapped bit-stream to the subchannel allocator 804. The subchannel allocator 804 maps a symbol onto a subchannel designated by the scheduler 810. The power controller 802 regulates a Tx power for each subchannel or subcarrier. The precoder 800 performs various functions, such as, pilot insertion, Inverse Fast Fourier Transform (IFFT), digital to analog conversion (DAC), and so forth.

Figure 9:
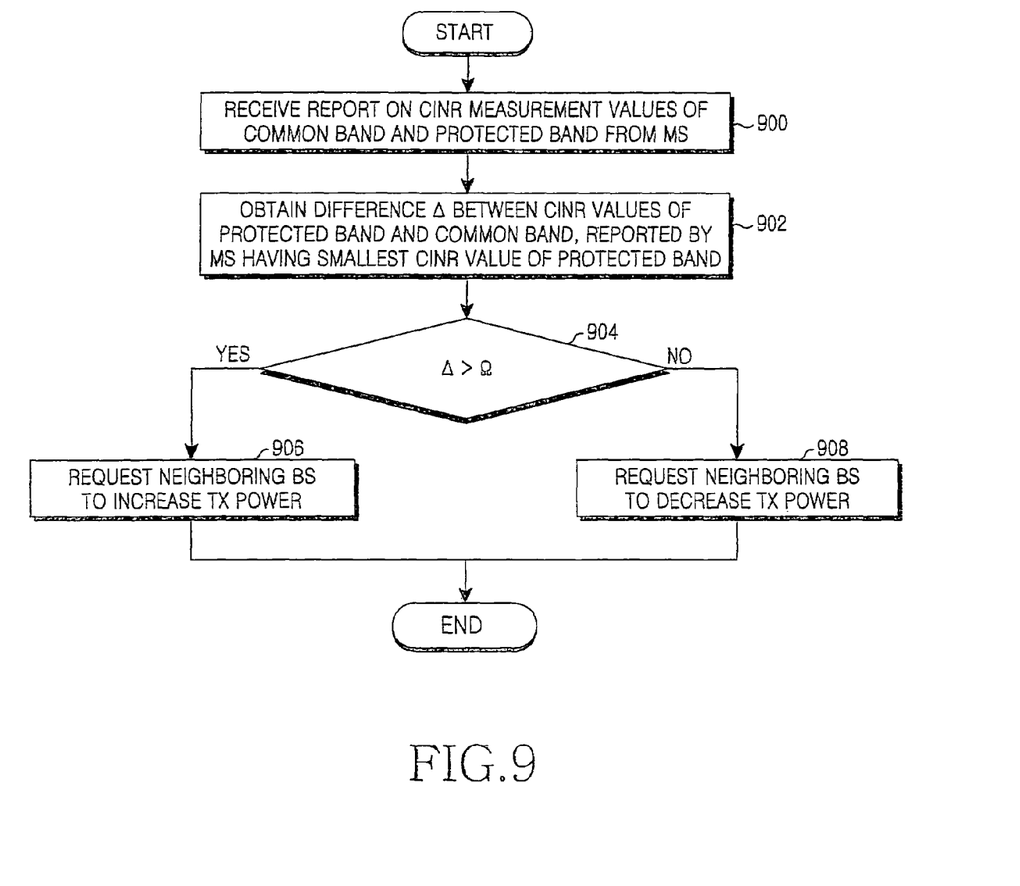
FIG. 9 is a flowchart illustrating an operation of a BS for controlling a Tx power in a mobile communication system based on fractional frequency reuse according to an exemplary embodiment of the present invention.

FIG. 9 is a flowchart illustrating an operation of a BS for controlling a Tx power in a mobile communication system based on fractional frequency reuse according to an exemplary embodiment of the present invention.

Referring to FIG. 9, the BS receives a report on CINR measurement values of a common band and a protected band from an MS assigned with a protected band within the BS in step 900. For example, in FIG. 3, the $MS_{12}$, the $MS_{22}$, and the $MS_{32}$ respectively transmit to corresponding BSs a DL CINR (i.e., $CINR_{K=1}$) of the common band (i.e., a band having a frequency reuse rate of '1') and a DL CINR (i.e., $CINR_{K=3}$) of the protected band (i.e., a band having a frequency reuse rate of '3').

In step 902, the BS selects an MS having a smallest CINR value from the reported CINR values measured in the protected band, and obtains a difference value ($\Delta$=CINR($CINR_{K=3}$)−CINR($CINR_{K=1}$)) of the two CINR values reported by the MSs.

In step 904, if the difference value Δ is greater than a specific threshold Ω, the BS determines that interference has a lesser effect in the protected band than a desired level, and otherwise, the BS determines that interference has a greater effect in the protected band than the desired level.

Herein, the threshold Ω may be a fixed specific value as a system parameter or may be adaptively regulated according to whether a quality of service (QoS) requirement is satisfied in an MS belonging to the coverage of the BS or according to variation of an entire system spectral efficiency. For example, if a specific MS located in a cell boundary area cannot satisfy the QoS requirement due to interference of a neighboring BS, the threshold Ω is increased as expressed by Equation 2 below. Otherwise, if the specific MS fully satisfies the QoS requirement, the threshold Ω is decreased as expressed by Equation 3 below:

$$\Omega new = \Omega old + STEP\_SIZE/N, \quad [Eqn. 2]$$

$$\Omega new = \Omega old - STEP\_SIZE. \quad [Eqn. 3]$$

Herein, STEP_SIZE and N are system parameters for regulating a variation width of the value Ω.

If it is determined in step 904 that DL interference has a greater effect in the protected band than the desired level, proceeding to step 908, the BS requests its neighboring BS to decrease a Tx power for a corresponding band.

Otherwise, if it is determined in step 904 that DL interference has a lesser effect in the protected band than the desired level, proceeding to step 906, the BS requests its neighboring BS to increase the Tx power for the corresponding band.

For example, in FIG. 5, the BS2 determines that DL interference has a greater effect in the protected band of the $MS_{22}$ and thus requests the BS1 and the BS3 to decrease the Tx power of the band F3. In addition, the BS3 determines that DL interference has a lesser effect in the protected band of the $MS_{32}$ and thus requests the BS2 to increase the Tx power of the band F4. Accordingly, the restricted band F3 of the BS1 and the Tx power of the band F4 are modified as expressed by Equation 4 and Equation 5 below:

$$PTX\_F3, t = PTX\_F3, t-1 - DOWN\_STEP, \quad [Eqn. 4]$$

$$PTX\_F4, t = PTX\_F4, t-1 + UP\_STEP. \quad [Eqn. 5]$$

Herein, t denotes a frame index, 'PTX_F3, t' denotes a maximum available Tx power of the band F3 at a $t^{th}$ frame, and 'PTX_F4, t' denotes a maximum available Tx power of the band F4 at the $t^{th}$ frame. DOWN_STEP and UP_STEP are system parameters which may be predetermined by all BSs or which may be modified through mutual negotiation when necessary.

Figure 10:
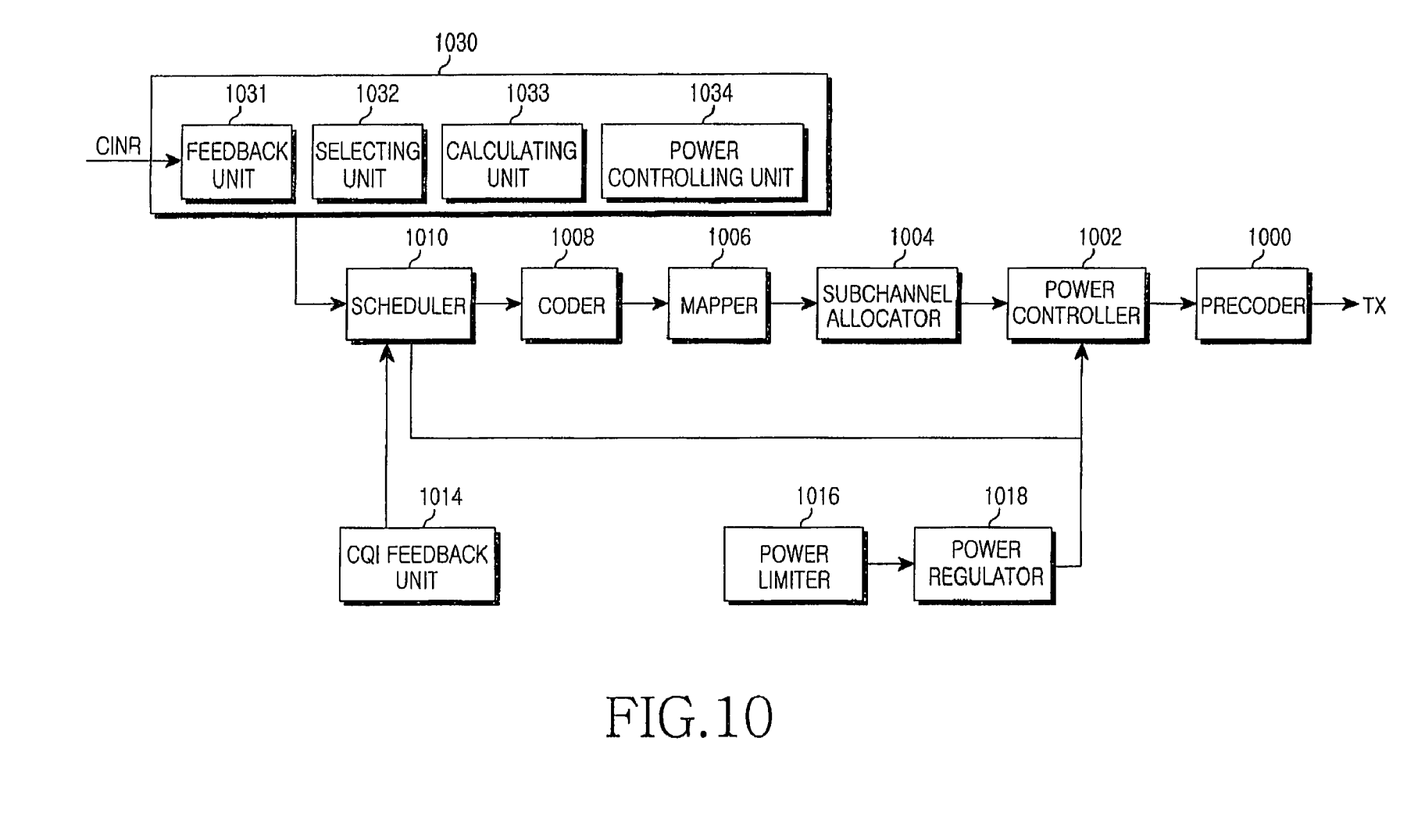
FIG. 10 is a block diagram of a BS for controlling a Tx power in a mobile communication system based on fractional frequency reuse according to an exemplary embodiment of the present invention.

FIG. 10 is a block diagram of a BS for controlling a Tx power in a mobile communication system based on fractional frequency reuse according to an exemplary embodiment of the present invention.

Referring to FIG. 10, the BS includes a precoder 1000, a power controller 1002, a subchannel allocator 1004, a mapper 1006, a coder 1008, a scheduler 1010, and a controller 1030. The controller 1030 includes a feedback unit 1031, a selecting unit 1032, a calculating unit 1033, and a power controlling unit 1034.

The feedback unit 1031 receives a report on CINR measurement values of a common band and a protected band from MSs. The selecting unit 1032 selects an MS having a smallest CINR value from the reported CINR values measured in a protected band. The calculating unit 1033 obtains a difference value (Δ=CINR(CINRK=3)-CINR(CINRK=1)) of the two CINR values reported by the MSs. If the difference value Δ is greater than a specific threshold Ω, the power controlling unit 1034 requests a neighboring BS to increase a Tx power of a restricted band through a backbone network. Otherwise, if the difference value Δ is less than the specific threshold Ω, the power controlling unit 1023 requests the neighboring BS to decrease the Tx power of the restricted band.

The feedback unit 1031, the selecting unit 1032, the calculating unit 1033, and the power controlling unit 1034 may be provided as parts of functions of the controller 1031. That is, the controller 1030 may perform all or some functions of the feedback unit 1031, the selecting unit 1032, the calculating unit 1033, and the power controlling unit 1034.

According to embodiments, the feedback unit 1031, the selecting unit 1032, the calculating unit 1033, and the power controlling unit 1034 may be separated from the controller 1030.

The scheduler 1010 determines a position and amount of the resource to be assigned to the selected MS and also determines a modulation order and a coding rate. The coder 1008 receives data from the scheduler 1010 and codes the data by using a convolution code or a convolutional turbo code (CTC). The mapper 1006 performs constellation mapping on a bit-stream received from the coder 1008 and outputs the mapped bit-stream to the subchannel allocator 1004. The subchannel allocator 1004 maps a symbol onto a subchannel designated by the scheduler 1010. The power controller 1002 regulates a Tx power for each subchannel or subcarrier. The precoder 1000 performs various functions, such as, pilot insertion, IFFT, DAC, and so forth. The channel quality indicator (CQI) feedback unit 1014 preserves a CQI value reported from each MS and delivers the CQI value to the scheduler 1010. The power limiter 1016 determines a maximum Tx power for each subchannel. The power regulator 1018 regulates a Tx power for each subchannel.

According to exemplary embodiments of the present invention, a maximum Tx power of a restricted band is regulated by recognizing a DL interference level of an MS currently using a protected band of a neighboring BS in a mobile communication system based on fractional frequency reuse. Therefore, resources can be further effectively used.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a serving base station (BS) for controlling a transmission (Tx) power in a mobile communication system based on fractional frequency reuse, the method comprising:
   receiving at the serving BS, from each of a plurality of neighboring BSs, an RSSI value for the serving BS together with a band index identifying a protected band of the neighboring BS, wherein the protected band of the neighboring BS comprises a restricted band of the serving BS;
   for each of the restricted bands of the serving BS, selecting by the serving BS a greatest RSSI value from the RSSI values received from the neighboring BSs corresponding to the restricted band;
   for each of the restricted bands of the serving BS, calculating at the serving BS a backoff value of the Tx power for the restricted band based on the selected greatest RSSI value corresponding to the restricted band; and
   for each of the restricted bands, determining at the serving BS the Tx power for the restricted band by using a difference between the backoff value of the Tx power for the restricted band and a maximum Tx power.

2. The method of claim 1, wherein the backoff values of the Tx power for the restricted bands are calculated according to:

$$RSSI - N - \beta \leq \Gamma,$$

where RSSI denotes an RSSI value measured by a corresponding mobile station (MS), N denotes a noise floor level, β denotes a backoff value of Tx power, Γ denotes a threshold for maintaining an RSSI of a signal, which is transmitted in a restricted band of a neighboring base station, to be below a specific value with respect to thermal noise.

3. The method of claim 1, wherein selecting the greatest RSSI value for each of the restricted bands comprises:
classifying the RSSI values received according to each of the restricted bands.

4. The method of claim 1, further comprising:
requesting mobile stations assigned a protected band of the serving BS measure RSSI values of the neighboring base stations;
receiving a report on the RSSI values of the neighboring base stations from the mobile stations;
for each of the neighboring base stations, selecting a greatest RSSI value among the reported RSSI values of the neighboring base station; and
for each of the neighboring base stations, transmitting the selected greatest RSSI value to the neighboring base station together with a band index identifying the protected band of the serving BS.

5. The method of claim 1, further comprising, for each of the restricted bands, estimating a carrier to interference and noise ratio (CINR) of the restricted band by considering the determined Tx power of the restricted band.

6. A serving base station (BS) apparatus for controlling a transmission (Tx) power in a mobile communication system based on fractional frequency reuse, the apparatus comprising:
a second selector configured to receive a received signal strength indication (RSSI) value for one or more restricted bands of the serving BS from neighboring base stations; and
a restricted-band power allocator configured to calculate backoff values of the Tx power for each of the restricted bands by using the received RSSI values and to determine the Tx power for each of the restricted bands by using a difference between the backoff value of the Tx power for the restricted band and a maximum Tx power.

7. The apparatus of claim 6, wherein the backoff values of the Tx power for the restricted bands are calculated according to:

$$RSSI-N-\beta \leq \Gamma,$$

where RSSI denotes an RSSI value measured by a corresponding mobile station, N denotes a noise floor level, $\beta$ denotes a backoff value of Tx power, $\Gamma$ denotes a threshold for maintaining received signal strength indication (RSSI) of a signal, which is transmitted in a restricted band of a neighboring base station, to be below a specific value with respect to thermal noise.

8. The apparatus of claim 6, wherein the second selector is further configured to classify the RSSI values received according to each restricted band and to select a greatest RSSI value for each restricted band, and wherein the restricted-band power allocator is further configured to calculate a backoff value of the Tx power for each of the restricted bands by using the RSSI value selected for the restricted band.

9. The apparatus of claim 6, further comprising:
a signal measurement requestor configured to request that mobile stations assigned a protected band of the serving BS measure RSSI values of the neighboring base stations;
a first selector configured to receive a report on the RSSI values of the neighboring base stations from the mobile stations and to select, for each of the neighboring base stations, a greatest RSSI value among the reported RSSI values of the neighboring base stations; and
a transmitter configured to transmit, to each of the neighboring base stations, the selected greatest RSSI value together with a band index identifying the protected band of the serving BS.

10. The apparatus of claim 6, further comprising a carrier to interference and noise ratio (CINR) calculator configured to estimate a carrier interference and noise ratio of each of the restricted bands by considering the determined Tx power of the restricted band.

11. A method of operating a mobile station (MS) for controlling a transmission (Tx) power in a mobile communication system based on fractional frequency reuse, the method comprising:
operating the MS in a protected band of a serving base station (BS);
receiving at the MS a request from the serving BS to measure received signal strength indication (RSSI) values of a neighboring BS;
measuring at the MS an RSSI value of the neighboring base stations; and
transmitting from the MS the measured RSSI value to the serving BS, wherein the measured RSSI value is transmitted from the serving BS to the neighboring BS through a backbone network, and wherein the neighboring BS determines a Tx power for a restricted band of the serving BS based on the measured RSSI value.

12. A method of controlling a transmission (Tx) power in a mobile communication system based on fractional frequency reuse, the method comprising:
for each of a plurality of neighboring base stations (BSs), receiving at a serving BS a report on measured received signal strength indication (RSSI) values from mobile stations (MSs) using a protected band of the serving BS;
for each of the neighboring BSs, transmitting from the serving BS to the neighboring BS a greatest RSSI value among the reported RSSI values for the neighboring BS together with a band index identifying the protected band of the serving BS through a backbone network;
receiving at the serving BS, from each of the neighboring BSs, an RSSI value for the serving BS together with a band index identifying a protected band of the neighboring BS, wherein the protected band of the neighboring BS comprises a restricted band of the serving BS;
for each of the restricted bands of the serving BS, selecting at the serving BS a greatest RSSI value from the RSSI values received from the neighboring BSs corresponding to the restricted band; and
for each of the restricted bands, determining at the serving BS the Tx power of the restricted band based on the selected greatest RSSI value corresponding to the restricted band.

13. The method of claim 12, further comprising requesting the MSs using the protected band of the serving BS measure the RSSI values of the neighboring BSs.

14. The method of claim 12, wherein the report includes BS identifications (IDs) of the neighboring BSs.

15. The method of claim 14, further comprising classifying the RSSI values in the received reports according to the neighboring BS IDs.

16. The method of claim 12, further comprising classifying the RSSI values received from the neighboring BSs.

17. The method of claim 12, wherein the Tx power of each of the restricted bands is determined to be equal to or less than a maximum Tx power.

18. The method of claim 12, wherein determining the Tx power of the restricted band comprises determining a backoff value for the restricted band.

19. The method of claim 18, wherein the backoff value for the restricted band is calculated according to:

$$RSSI - N - \beta \leq \Gamma,$$

where RSSI denotes an RSSI value measured by a corresponding mobile station (MS), N denotes a noise floor level, β denotes the backoff value of the Tx power for a corresponding band, Γ denotes a threshold for maintaining an RSSI of a signal, which is transmitted in a restricted band of a neighboring base station, to be below a specific value with respect to thermal noise.

20. The method of claim 12, further comprising, for each of the restricted bands, estimating a carrier to interference and noise ratio (CINR) of the restricted band by considering the determined Tx power of the restricted band.

* * * * *